(12) United States Patent
Wang et al.

(10) Patent No.: US 10,061,787 B2
(45) Date of Patent: Aug. 28, 2018

(54) UNIFIED DATA MODEL FOR INTEGRATION BETWEEN RELATIONAL AND NON-RELATIONAL DATABASES

(71) Applicant: CA, Inc., New York, NY (US)

(72) Inventors: Zheng Wang, Beijing (CN); Bowen Yang, Beijing (CN); Di Sang, Beijing (CN); Xiaomeng Zhao, Beijing (CN); Shuai Gou, Beijing (CN); Jing Li, Beijing (CN); Xin Wang, Beijing (CN); Tianyu Jia, Beijing (CN); Dahan Gong, Beijing (CN)

(73) Assignee: CA, Inc., New York, NY (US)

( * ) Notice: Subject to any disclaimer, the term of this patent is extended or adjusted under 35 U.S.C. 154(b) by 267 days.

(21) Appl. No.: 15/011,009

(22) Filed: Jan. 29, 2016

(65) Prior Publication Data

US 2017/0220606 A1 Aug. 3, 2017

(51) Int. Cl.
*G06F 17/30* (2006.01)
*G06F 7/00* (2006.01)
*G06N 5/04* (2006.01)

(52) U.S. Cl.
CPC ......... *G06F 17/30294* (2013.01); *G06N 5/04* (2013.01)

(58) Field of Classification Search
CPC .......... G06F 17/30292; G06F 17/3064; G06Q 10/10
USPC ...................................................... 707/803
See application file for complete search history.

(56) References Cited

U.S. PATENT DOCUMENTS

| | | | |
|---|---|---|---|
| 2002/0143521 A1* | 10/2002 | Call | G06F 17/2247 704/1 |
| 2006/0004725 A1* | 1/2006 | Abraido-Fandino | G06F 17/30864 |
| 2006/0200753 A1* | 9/2006 | Bhatia | G06F 17/30893 715/203 |
| 2010/0070448 A1* | 3/2010 | Omoigui | H01L 27/1463 706/47 |

OTHER PUBLICATIONS

Hsieh, "NoSQL Data Modeling", eBay Tech Blog, Oct. 10, 2014, 12 pages http://www.ebaytechblog.com/2014/10/10/nosql-data-modeling/ as visited Sep. 24, 2015.

(Continued)

*Primary Examiner* — Kuen S Lu
(74) *Attorney, Agent, or Firm* — Gilliam IP PLLC

(57) ABSTRACT

Schema-less databases can make data modeling and data management difficult and can detrimentally affect integration with an RDBMS. Inferring a schema from a schema-less database can improve integration by indicating a structure or organization of data in the schema-less database. A schema analyzer can infer a schema by processing data of the schema-less database to identify statistically significant data fields. The schema analyzer then creates a schema that comprises the statistically significant data fields. A data modeler can use the resulting schema along with a schema for a RDBMS to generate a unified data model. A user may submit a query based on the unified data model to obtain results from both databases. The data modeler translates the query from the unified model to be compatible with each of the schemas so that data may be written to or retrieved from each of the schema-less database and the RDBMS.

20 Claims, 7 Drawing Sheets

(56) References Cited

OTHER PUBLICATIONS

Klettke, et al., "Schema Extraction and Structural Outlier Detection for JSON-based NoSQL Data Stores", 2014, 20 pages http://btw-2015.de/res/proceedings/Hauptband/Wiss/Klettke-Schema_Extraction_and_Stru.pdf as visited Dec. 17, 2015.
Ruiz, et al., "Inferring Versioned Schemas from NoSQL Databases and Its Applications", Springer International Publishing, Switzerland, 2015, pp. 467-480 http://link.springer.com/chapter/10.1007/978-3-319-25264-3_35#page-1 as visited Dec. 14, 2015.

\* cited by examiner

US 10,061,787 B2

UNIFIED DATA MODEL FOR INTEGRATION BETWEEN RELATIONAL AND NON-RELATIONAL DATABASES

BACKGROUND

The disclosure generally relates to the field of computer systems, and more particularly to determining a schema for a schema-less database.

A database schema is essentially a blueprint that describes the organization and structure of data in a database. For example, a schema for a relational database may describe tables, relationships between the tables, column names and data types for the tables, etc. A relational database management system ("RDBMS") strictly enforces a schema to provide a predictable structure of the data and normalized data sets. Alternatively, in order to provide more flexibility than an RDBMS, some database management systems utilize schema-less data storage. For example, Not Only SQL ("NoSQL") databases include various types of schema-less databases such as key-value stores, document databases, wide-column databases, and graph databases. The schema-less design of NoSQL databases allows data to be stored in other data structures besides relational data structures. A key-value database stores data as an attribute name with a value. A document database stores data as a collection of documents such as Javascript Objection Notation ("JSON"), Binary JSON ("BSON"), or extensible markup language ("XML") documents. A graph database stores data as a series of connected nodes. A wide-column database (or column database) uses a flexible number of columns that are created for each row individually as opposed to an entire table of data.

BRIEF DESCRIPTION OF THE DRAWINGS

Embodiments of the disclosure may be better understood by referencing the accompanying drawings.

DESCRIPTION

Figure 1:
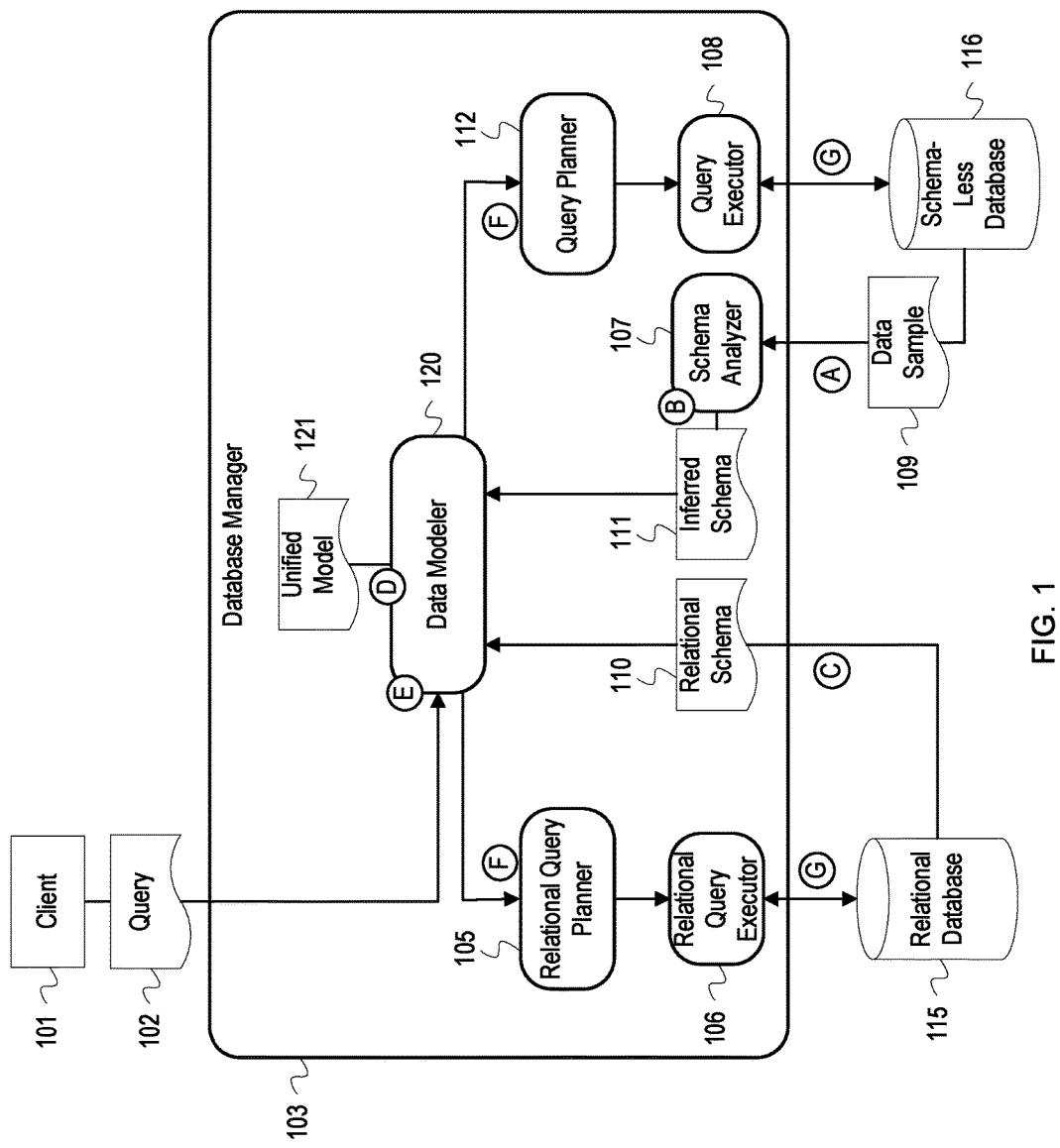
FIG. 1 depicts an example database manager that integrates a relational database and a schema-less database using a unified data model.

The description that follows includes example systems, methods, techniques, and program flows that embody aspects of the disclosure. However, it is understood that this disclosure may be practiced without these specific details. For instance, this disclosure refers to NoSQL databases including key-value, column oriented, document, and graph types. But aspects of this disclosure can be applied to other types of schema-less databases, such as Datomic. In other instances, well-known instruction instances, protocols, structures and techniques have not been shown in detail in order not to obfuscate the description.

Terminology

This description uses the term "schema" to refer to a set of data that describes a structure or organization of data in a database. A schema as used herein may refer to a graphical depiction or physical model of a database structure or text that describes the organization of data in a language that can be interpreted by a database. This description also uses the term "schema-less" to describe some databases. Referring to these databases as "schema-less" does not mean that the data stored in these databases is unstructured or unorganized. Rather the term is used to refer to the fact that the databases do not adhere to a strict uniform, normalized structure and may include varying organizational structures for data and denormalized data. Some schema-less databases may be referred to as non-relational databases since a relational data model is not used.

This description uses the term "record" to refer to a discrete set of data fields or attributes in a database. For example, a database may contain a number of sets of data that include two data fields or attributes "username" and "password." A record would be a single set of the "username" and "password" data fields. The term "record," when used in the context of relational databases, is typically used to refer to a row in a table with the columns of the row being the set of data fields. In other database types, a record may not be a row but rather some other data structure. For example, in a document database, a record is a single document with key value pairs that are considered data fields. In a key-value store, a record may be an attribute name and value pair or a set of related attribute and value pairs. Each pair is considered a data field. In a graph database, a record is a node of the graph which may contain one or more data fields. In a column database, the term record refers to a row of columns with each column being a data field.

Overview

Because of their flexibility, schema-less databases can make data modeling and data management difficult and can detrimentally affect integration with an RDBMS. For example, writing data from a RDBMS to a schema-less database can be difficult without knowing how to translate relational data to conform to existing data on the schema-less database. Inferring a schema from a schema-less database can alleviate these issues by indicating a structure or organization of data in the schema-less database. A schema analyzer can infer a schema by processing data of the schema-less database to identify statistically significant data fields. A statistically significant data field may be, for example, a data field that occurs in at least 50% of the records in a database. The schema analyzer then creates a schema that comprises the statistically significant data fields. A data modeler can use the resulting schema or a schema for a RDBMS to generate a unified data model. A user may submit a query based on the unified data model to obtain results from both the RDBMS and the schema-less database. The data modeler translates the query from the unified model to be compatible with each of the schema-less database and the RDBMS so that data may be written to or retrieved from each of the databases.

Example Illustrations

FIG. 1 depicts an example database manager that integrates a relational database and a schema-less database using a unified data model. FIG. 1 depicts a database manager 103 communicatively coupled to a client 101, a relational database 115, and a schema-less database 116. The client 101 may be one of a plurality of clients (not depicted) that are communicatively coupled to the database manager 103, such as computing systems, storage devices, virtual machines, applications, application components, etc. The database manager 103 includes a relational query planner 105, a relational query executor 106, a schema analyzer 107, a query planner 112, a query executor 108, and a data modeler 120. FIG. 1 is annotated with a series of letters A-G. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

The relational database 115 is a database based on a relational data model such as Microsoft SQL, SQLite, etc. The schema-less database 116 may be a schema-less database such as a type of NoSQL database. The relational database 115 and the schema-less database 116 may include similar or duplicate data. For example, a company may store new user account information in the schema-less database 116 and maintain older accounts or other legacy data on the relational database 115. As a result, a user may query the database manager 103 to retrieve data from both the relational database 115 and the schema-less database 116.

At stage A, the schema analyzer 107 reads data sample 109 from the schema-less database 116. The schema analyzer 107 is software or program code of the database manager 103. The schema analyzer 107 may retrieve the data sample 109 from the schema-less database 116 using Structured Query Language ("SQL") queries or an application programming interface ("API"), such as the Hyptertext Transfer Protocol ("HTTP") REST API. The data sample 109 is a portion of the data contained in the schema-less database 116. For example, if the schema-less database 116 is a document database with 1,000 documents, the data sample 109 may consist of one hundred documents. The size of the data sample 109 may be based on a percentage of the total amount of data contained in the schema-less database 116. For example, the schema analyzer 107 may be programmed to retrieve 50% of the number of records in the schema-less database 116. In some instances, if the data size of the schema-less database 116 is below a certain amount, the schema analyzer 107 may retrieve all records in the schema-less database 116. The schema analyzer 107 may store the data sample 109 in memory of a system executing the database manager 103.

At stage B, the schema analyzer 107 determines an inferred schema 111 from the data sample 109. The schema analyzer 107 processes the data sample 109 and generates schema data (not depicted) that is used to determine an inferred schema. The schema data includes information related to the frequency of data field occurrences in the records of the data sample 109. For example, the schema data may indicate that a particular data field occurred in 80 out of 100 records in the data sample 109. The schema analyzer 107 uses the information related to frequency of data fields to identify statistically significant data fields. The schema analyzer 107 may be programmed to identify statistically significant data fields based on a percentage of records that include the data field in the data sample 109, whether the frequency of the data field satisfies a threshold, the frequency of the data field in relation to other data fields of the data sample 109, etc. For example, a data field may be statistically significant if it occurs in 60% of the records of the data sample 109. As an additional example, a data field may be statistically significant if it occurs in at least a threshold number of records in the data sample 109. The schema analyzer 107 includes the statistically significant data fields in the inferred schema 111.

The schema analyzer 107 may also write other information in the schema data such as the data types of data fields, a hierarchical location of the data field, dependency relationships, etc. For example, if a record contains a data field that has sub-data fields, the schema analyzer 107 indicates in the schema data that the sub-data fields are located lower in a hierarchy. Also, some data fields may include references to other records, similar to a relational database. The schema analyzer 107 may indicate the reference in the schema data. The schema analyzer 107 may use the additional information in the schema data to further describe a structure of the data in the schema-less database 116 in the inferred schema 111. For example, if a reference to another record is indicated, the schema analyzer 107 may incorporate the data fields of a referenced record into the parent record as sub-data fields and indicate this in the inferred schema 111. Once the inferred schema 111 is determined, the schema analyzer 107 sends the inferred schema 111 to the data modeler 120.

At stage C, the data modeler 120 retrieves a relational schema 110 from the relational database 115. Unlike the schema-less database 116, the schema of a relational database 115 is generally readily ascertainable. The relational schema 110 may be stored in a data dictionary or metadata of the relational database 115. Additionally, the data modeler 120 may determine the relational schema 110 based on the relationships between and columns of tables in the relational database 115.

At stage D, the data modeler 120 generates a unified model 121 based on the relational schema 110 and the inferred schema 111. The unified model 121 is a high level data model that expresses data based on database entities ("entities"). For example, an entity in the relational database 115 would be a table with each column being an attribute or data field. The data modeler 120 identifies entities, i.e. tables, in the relational schema 110 and their attributes, i.e. column names. An entity in the schema-less database 116 may be a document, a column family, a graph node, etc. An attribute in the schema-less database 116 may be attributes listed in a document, names of columns in a column family, etc. The data modeler 120 identifies additional entities in the inferred schema 111. The data modeler 120 adds entities identified in the relational schema 110 and the inferred schema 111 to the unified model 121. Before adding the entities, the data modeler 120 may deduplicate entities from the different schemas. Additionally, the data modeler 120 may create a new entity that maps to similar entities in the relational schema 110 and the inferred schema 111. As described in more detail in FIG. 3, the data modeler 120 may also add properties or information regarding relationships between the entities as determined from the relational schema 110 or the inferred schema 111 to the unified model 121 and may add information related to query patterns to the data modeler 120.

At stage E, the data modeler 120 receives a query 102 based on the unified model 121 from the client 101. The client 101 may submit the query 102, which may conform to SQL or an API utilized by the database manager 103. The client 101 may structure the query 102 to request that the database manager 103 return data, write data to a database, perform a search, etc. Since the query 102 is based on the unified model 121, the query 102 may be used to access the relational database 115 and the schema-less database 116. For example, the client 101 may receive results from both the relational database 115 and the schema-less database 116 in response to submitting the query 102. The data modeler 120 transforms the query 102 based on the unified model 121 into a first query that is compatible with the relational schema 110 and a second query that is compatible with the inferred schema 111. The data modeler 120 may transform the query 102 by mapping the names of entities or attributes in the unified model 121 to names of entities or attributes in the relational schema 110 or the inferred schema 111. In instances where the query 102 includes data to write to the databases, the data modeler 120 may have to normalize the data to be written to the relational database 115 and denormalize the data to be written to the schema-less database 116 as part of the transformation process. The data modeler 120 sends the first transformed query to the relational query planner 105 and the second transformed query to the query planner 112.

At stage F, the relational query planner 105 and the query planner 112 create query plans in accordance with the schema and data for each database. For example, when creating a query plan for the relational database 115, the query planner 105 utilizes the relational schema 110. When creating a query plan for the schema-less database 116, the query planner 112 utilizes the inferred schema 111.

At stage G, the relational query executor 106 and the query executor 108 execute the query plans. The relational query executor 106 executes the query plan generated based on the relational schema 110 on the relational database 115. The query executor 108 executes the query plan generated based on the inferred schema 111 on the schema-less database 116. The data returned from the relational database 115 and the schema-less database 116 may be formatted or merged by a component of the database manager 103 before being returned to the client 101. Additionally, the data may be restructured in accordance with the unified model 121.

In addition to the functions described above, the database manager 103 can use the unified model 121, the relational schema 110, and the inferred schema 111 to migrate data from the relational database 115 to the schema-less database 116 or vice-versa. The database manager 103 may read data from the relational database 115 in accordance with the relational schema 110 and transform the data to be compatible with the unified model 121. The database manager 103 may then restructure the data from the unified model 121 to conform to the inferred schema 111 before migrating the data to the schema-less database 116.

The schema-less database 116 is referred to as having a single database or collection of data and therefore a single inferred schema. However, the schema-less database 116 may include multiple databases, and therefore, multiple schemas may be inferred from the schema-less database 116. For example, a first database in the schema-less database 116 may include products available for sale. The schema analyzer 107 may determine a first inferred schema that describes the organization of data related to the products in the first database. A second database may describe purchase orders. The schema analyzer 107 may determine a second inferred schema that describes the organization of data related to the purchase orders in the second database. The different schemas may be used separately by the query planner 112 or may be combined into a single schema that identifies a relationship between the second database of purchase orders and the first database of products.

Figure 2:
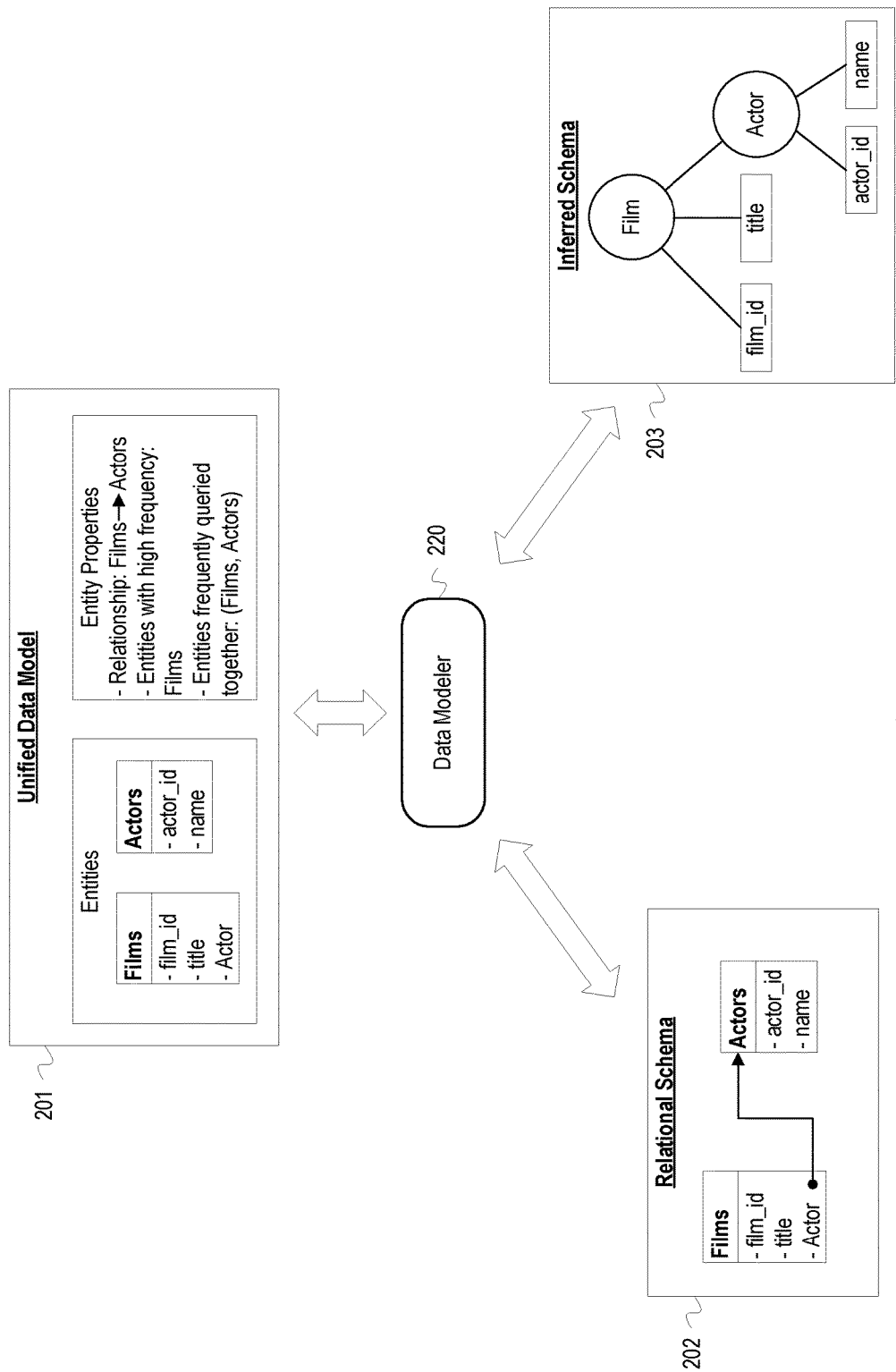
FIG. 2 depicts an example data modeler that translates between a unified data model and a relational schema and an inferred schema.

FIG. 2 depicts an example data modeler that translates between a unified data model and a relational schema and an inferred schema. FIG. 2 depicts a data modeler 220, a unified data model 201, a relational schema 202, and an inferred schema 203.

The relational schema 202 is a schema that was extracted from a relational database. The inferred schema 203 is a schema that was extracted from a schema-less database. The inferred schema 203 is depicted as a JSON document structure for a document type NoSQL database. In other embodiments, the inferred schema 203 may be from a column, key value, or graph type database.

The data modeler 220 generates the unified data model 201 ("model 201") based on the relational schema 202 and the inferred schema 203. To generate the unified data model 201, the data modeler 220 identifies entities in the relational schema 202 and the inferred schema 203. Entities in the relational schema 202 are tables of the relational database. The relational schema 202 contains two tables, "Film" and "Actor." The data modeler 202 adds these entities to the model 201. The data modeler 220 analyzes the document structure of the inferred schema 203 and identifies the same entities in the inferred schema 203. The data modeler 220 may determine that the entities of the inferred schema 203 are the same as the entities of the relational schema 202 by comparing the attribute names, number of attribute or data fields, data types of the attributes, etc. Since the entities of the inferred schema 203 are the same as the relational schema 202, the data modeler 220 does not add the entities to the model 201.

The data modeler 220 also determines entity properties which may include relationship information, the size or number of entities, entities frequently queried together or query patterns, etc. The data modeler 220 may determine these properties by analyzing data in the databases, analyzing query history, analyzing the relational schema 202 and the inferred schema 203, etc. In FIG. 2, the data modeler 220 identifies the relationship between the entities Film and Actor and indicates this relationship in the entity properties of the model 201. The data modeler 220 also determines that the entity Films occurs frequently in data and that the entities Films and Actors are frequently queried together. The data modeler 220 may determine that the entities are frequently queried together based on a number of times which the entities were queried together exceeding a threshold. Although depicted as separate in FIG. 2, the entity properties may be tagged to the entities themselves. For example, a data structure that represents the entity may be modified to include tags of entity properties such as "high volume" or "frequently queried with entity x."

When transforming from the model 201 to either the relational schema 202 or the inferred schema 203, the data modeler 220 uses the identified entities and entity properties of the model 201. Each entity property of the model 201 may be associated with a particular transformation behavior. For example, when transforming from the model 201 to the inferred schema 203, the data modeler 220 may determine that since Films and Actors are related and are frequently queried together that Actors entities should be embedded within a Film entity, thereby creating an aggregate entity based on the film entity. Based on this determination, the data modeler 220 may denormalize an Actor entity as part of the transformation from the model 201 to the inferred schema 203 so that the Actor entity is embedded within each corresponding Film entity. Entity properties identified in the model 201 may trigger a different transformation behavior based on whether data is being transformed from the model 201 to the relational schema 202 or the inferred schema 203. For example, since a relational database does not support denormalization of data, the data modeler 220 could not embed Actors entities within a Film entity during transformation in response to the property indicating that these entities are frequently queried together. However, the data modeler 220 may optimize a query plan or strategically store tables for the entities in order to enable a quicker query response time for the two frequently queried entities.

Figure 3:
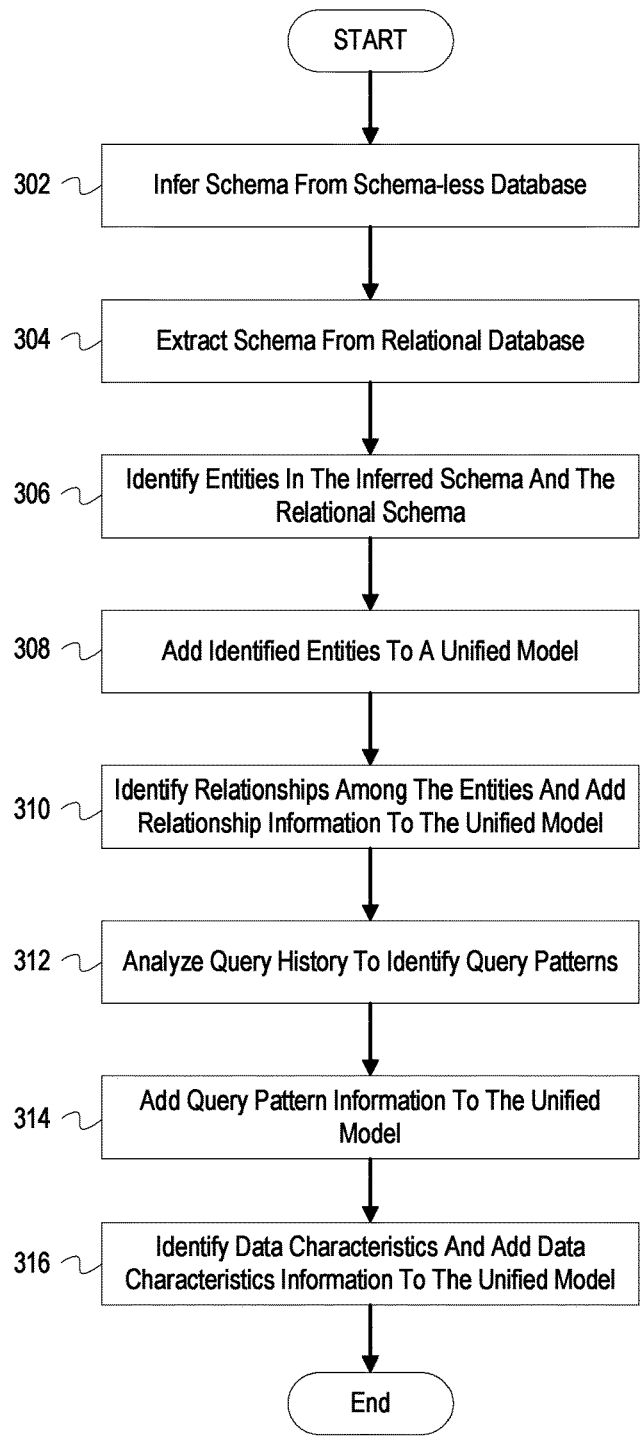
FIG. 3 depicts a flow diagram of example operations for creating a unified data model.

FIG. 3 depicts a flow diagram of example operations for creating a unified data model. The operations described in FIG. 3 are described as being performed by a data modeler, such as the data modeler 120 depicted in FIG. 1.

A data modeler infers schema from a schema-less database (302). The data modeler or related component such as a schema analyzer infers a schema from a schema-less database as described in more detail in FIG. 4.

The data modeler extracts schema from a relational database (306). As described in FIG. 1, schema may be readily ascertained from a relational database. The data modeler extracts the relational schema from the relational database.

The data modeler identifies entities in the inferred schema and the relational schema (306). The data modeler identifies tables in the relational schema as entities. The data modeler may parse the relational schema according to the database language used to express the relational schema, such as the unified modeling language ("UML"), to identify a table. The data modeler may use the name of the table as the name for the corresponding entity and the column names of the table as the attribute names for the entity. For the inferred schema, the data modeler identifies entities indicated by the inferred schema. The inferred schema contains entities that were parsed or extracted from the schema-less database as described in FIG. 4. Identification of an entity is based on the type of the schema-less database. For example, if the database is a document database, the data modeler may identify a document as an entity and any key value pairs contained within the document as attributes. The document may be parsed from the document database according to the database language, such as JSON or BSON. In some implementations, the data modeler may identify entities in just the relational schema or, conversely, just the inferred schema.

The data modeler adds identified entities to a unified model (308). The entities in the unified data model are exposed so that a user can access entity data agnostic of any database type, such as relational or NoSQL. So, if an entity is indicated in the unified data model, then data corresponding to the entity exists in either the relational or schema-less database. The data modeler may deduplicate or merge entities so that, even if an entity exists on both a relational and a schema-less database, the entity is presented a single time. The data modeler may indicate entities in the unified model using UML, XML, JSON, B SON, etc.

The data modeler identifies relationships among the entities and adds relationship information to the unified model (310). The data modeler identifies relationships indicated in the relational schema and the inferred schema. The relationship information indicates which entities are related. For example, a first entity may have an attribute that includes identifiers for a second entity, or a first entity may be embedded within a second entity. Without using schemas, the data modeler may determine relationship information by identifying associated entities in the data of the relational database or the schema-less database. Associated entities may be identified based on a reference from one entity to another or one entity being embedded within another. The data modeler may record this information using UML, WL, JSON, BSON, etc.

The data modeler analyzes query history to identify query patterns (312). The data modeler determines query patterns such as identifying a frequently queried entity, multiple entities that are frequently queried together, rarely used entities, etc. The data modeler can determine these patterns by analyzing a query history for the relational database and a query history for the schema-less database.

The data modeler adds query pattern information to the unified model (314). The query pattern information includes any patterns identified for entities of the unified model. For example, if a query pattern indicates that an entity is rarely queried, the data modeler includes this in the query pattern information. The query pattern information is included in the unified model and may be used by the data modeler when transforming between the unified model and the database schemas. For example, when transforming data between the unified model and the schema-less database schema, the data modeler may embed a first entity within a second entity if those entities are frequently queried together, as opposed to creating a reference from the second entity to the first entity.

The data modeler identifies entity characteristics and adds entity characteristics information to the unified model (316). The data modeler analyzes the relational database and the schema-less database to determine characteristics for entities in the unified model. Characteristics may include the number of instances of the entity, frequency of the entity in relation to other entities, number of references to the entity, etc. For example, the data modeler may determine that an entity occurs a threshold number of times, e.g. over a million, in the relational database and indicate that the entity is a large volume entity in the entity characteristics information. The entity characteristics information is included in the unified model and may be used by the data modeler when transforming between the unified model and the database schemas. For example, when transforming data between the unified model and the schema-less database schema, the data modeler may determine that a large volume entity should not be embedded and should be referenced in order to prevent denormalization of the large volume entity.

In the operations described in FIG. 3, the unified data model is created using a combination of data and schema from both the relational database and the schema-less database. In some instances, one of the databases may not be populated with data or may not yet be active or configured. In such instances, the data modeler may create the unified data modeler using just the relational database or the schema-less database. For example, the data modeler may extract schema and identify entities in the relational database and develop the unified model based on the relational schema and identified entities.

Figure 4:
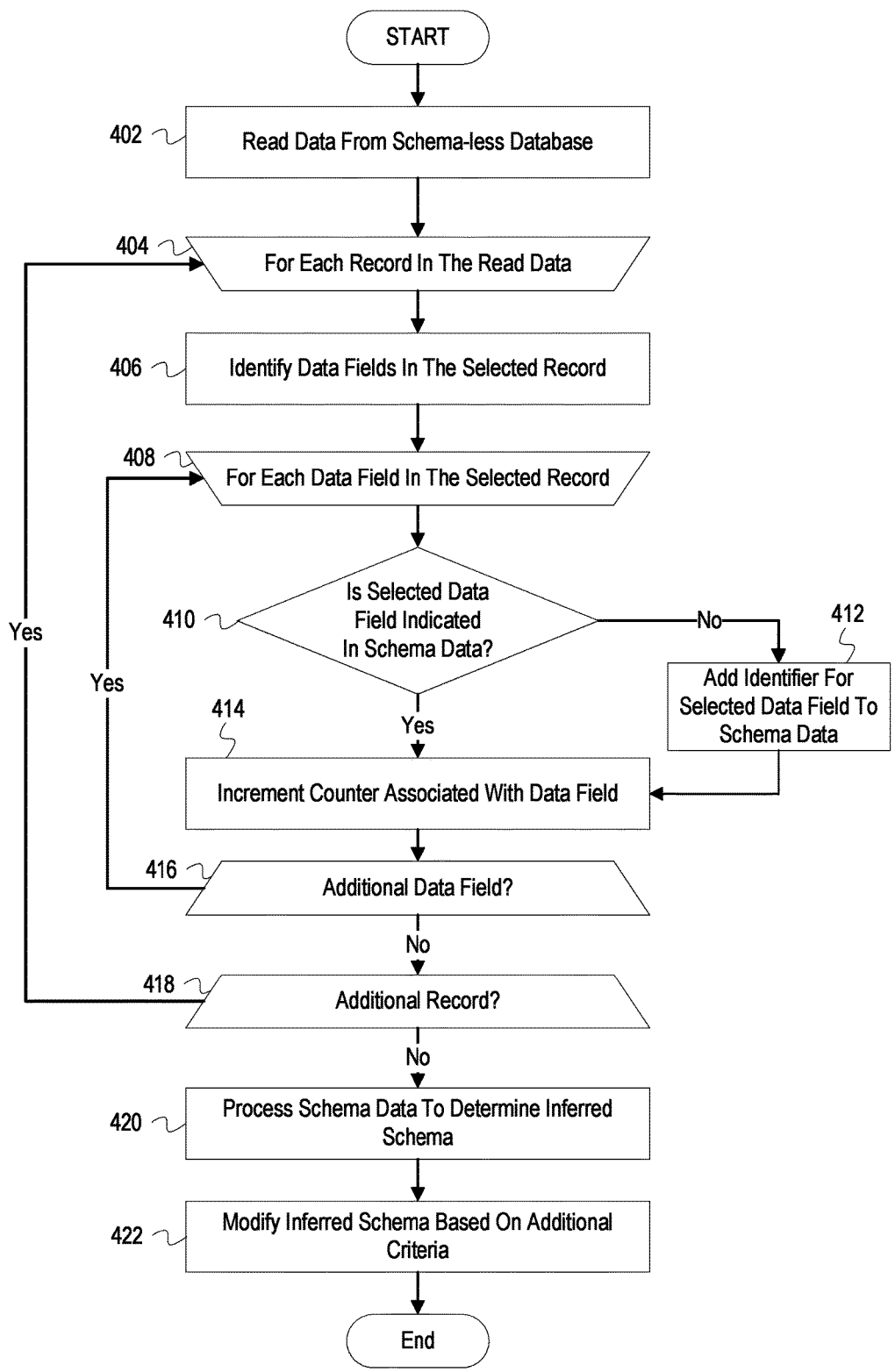
FIG. 4 depicts a flow diagram of example operations for inferring a schema from a schema-less database.

FIG. 4 depicts a flow diagram of example operations for inferring a schema from a schema-less database. The operations described in FIG. 4 are described as being performed by a schema analyzer, such as the schema analyzer 107 depicted in FIG. 1.

The schema analyzer reads data from a schema-less database (402). The schema analyzer may retrieve the data from the schema-less database using a query which conforms to SQL or an API compatible with the database. The schema analyzer may read all data from the database or a portion of the data. The amount of data read may be based on percentage of a total amount of data, a threshold amount of data, etc. The read data may consist of sequential records in the database or consist of records randomly sampled from the database. For example, the schema analyzer may read the first 100 records in the database, or the schema analyzer may read groups of ten records from different locations of the database, e.g. reads records 1-10, then reads records 101-110, etc. The amount of data read may also vary based on the type of schema-less database. As described above, a schema-less database such as NoSQL includes four types of databases: key-values, documents, columns, and graph. If the database is a key-value store, the schema analyzer may be programmed to read a threshold number of key-values. If the database is a graph database, the schema analyzer may be programmed to read a threshold number of nodes of the graph and their relationships. Similarly, the schema analyzer may be programmed to read a threshold number of documents from a document database or a threshold number of rows from a column database. The read data may be stored in memory of a system executing the schema analyzer.

The schema analyzer begins analyzing each record in the read data (404). The record currently being analyzed by the schema analyzer is hereinafter referred to as the "selected record."

The schema analyzer identifies data fields in the selected record (406). The schema analyzer may parse the record to identify the data fields. For example, if the record is a JSON document from a document database, the schema analyzer may parse the document in accordance with JSON grammar to identify data fields. The schema analyzer may organize or populate a data structure with the identified data fields. For example, the schema analyzer may create a list with the name or identifier of each data field. In some instances, a record may include data fields that have sub-data fields or data fields that are lower in a hierarchy. The schema analyzer may indicate that a data field is a sub-data field by including a hierarchy level number, appending sub-data field names to the names of parent data fields, etc.

The schema analyzer begins processing each data field in the selected record (408). In some instances, the schema analyzer may first deduplicate data fields. For example, a document may contain multiple instances of the same data fields. The schema analyzer may remove the duplicate instances so that the data field is only counted a single time. The data field currently being processed by the schema analyzer is hereinafter referred to as the "selected data field."

The schema analyzer determines if the selected data field is indicated in schema data (410). The schema data includes a list of data fields that have been encountered during processing of the records. The schema analyzer determines if the selected data field is already indicated in the schema data by searching the schema data with the identifier for the selected data field.

If the schema analyzer determined that the selected data field is not indicated in the schema data, the schema analyzer adds an identifier for the selected data field to the schema data (412). The schema analyzer adds the identifier to the schema data along with a counter. The schema analyzer may also add other data related to the data field such as a data type or size.

If the schema analyzer determined that the selected data field is indicated in the schema data or the schema analyzer added the selected data field to the schema data, the schema analyzer increments a counter associated with the selected data field (414). The counter tracks the number of times that a data field has been encountered throughout the records.

The schema analyzer determines if there is an additional data field in the selected record (418). If there is an additional data field in the selected record, the schema analyzer begins processing the next data field (408).

If there is not an additional data field in the selected record, the schema analyzer determines if there is an additional record in the data (418). If there is an additional record in the read data, the schema analyzer begins processing the next record (404).

If there is not an additional record in the read data, the schema analyzer processes the schema data to determine an inferred schema for the schema-less database (420). The schema analyzer identifies statistically significant data fields using the schema data. The schema analyzer may be programmed to identify statistically significant data fields based on a percentage of records that include the data field, whether the frequency of the data field satisfies a threshold, the frequency of the data field in relation to other data fields, etc. For example, the schema analyzer may average the value of the counters in the schema data and determine all data fields greater than the average to be statistically significant. The schema analyzer includes the statistically significant data fields in the inferred schema. The inferred schema may also indicate data types of each data field and any relationships between data fields. The inferred schema may be a data structure that reflects the organization of records in the database or an extensible markup language ("XML") file that describes the organization or structure of the records in the database. For example, the inferred schema may be a tree structure with each node being a data field and leaves indicating a reference or sub-data field.

The schema analyzer modifies the inferred schema based on additional criteria (422). The inferred schema may be modified based on query patterns, statistical significance, user input, etc. For example, the schema analyzer may determine that the data in the database is most frequently queried based on a certain data field, such as username. The schema analyzer may modify the inferred schema to indicate other data fields as sub-fields of the username data field creating an aggregate entity based on the username data field. The schema analyzer may perform the same modification for data fields that indicate greater statistical significance in comparison to other data fields. As an additional example, a query pattern may indicate that a first record and a second record are frequently queried together based on a relationship between the two records, e.g. the first record contains a reference to the second record. In response to this query pattern, the schema analyzer may modify the inferred schema to include the data fields of the first record and the second record. Additionally, a user may manually modify an inferred schema to conform to planned usage of the database. For example, the user may incorporate a data field that was determined to be statistically insignificant into the inferred schema.

Figure 5:
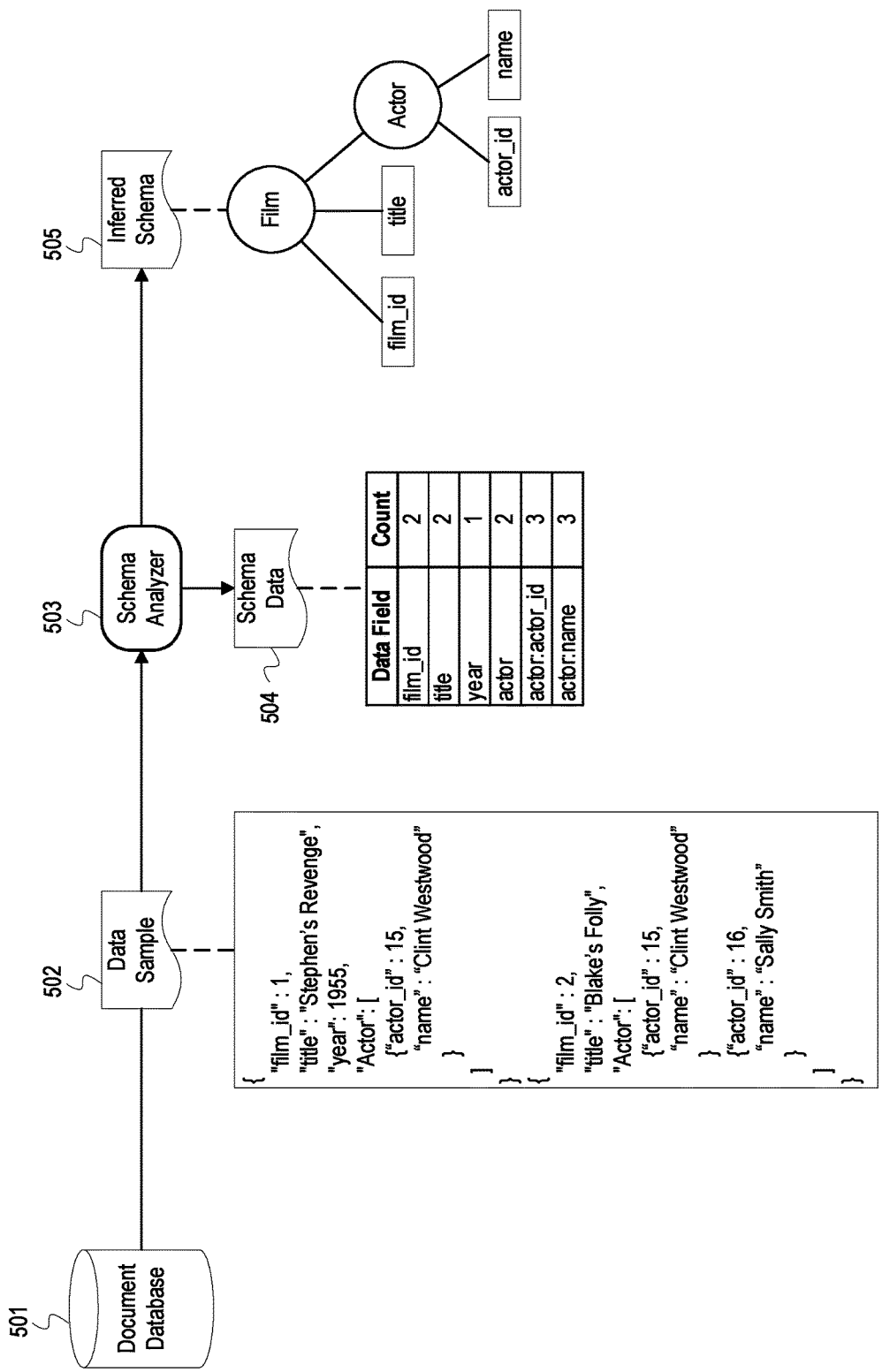
FIG. 5 depicts an example schema analyzer that determines an inferred schema from a schema-less database.

FIG. 5 depicts an example schema analyzer that determines an inferred schema from a schema-less database. FIG. 5 depicts a schema analyzer 503 that is communicatively coupled to a document database 501. The document database 501 is a schema-less, NoSQL database that stores documents such as MongoDB.

The schema analyzer 503 reads the data sample 502 from the document database 501. As depicted in FIG. 5, the data sample 502 includes two JSON documents that each include data related to a film. The schema analyzer 503 processes the data sample 502 as described in the operations of FIG. 2. The schema analyzer identifies the first record in the data sample 502 which in FIG. 5 is a document that includes the film_id of 1. The schema analyzer 503 then identifies data fields in the document.

The schema analyzer 503 writes identifiers for the data fields in schema data 504. Additionally, the schema analyzer 503 creates a counter associated with each data field. When analyzing the first document, the schema analyzer 503 first identifies the data field "film_id." The schema analyzer 503 then writes "film_id" to the schema data 504 and increments a counter associated with the data field to 1. The schema analyzer 503 performs the same operations for the data fields "title," "year," and "Actor." After processing the "Actor" data field, the schema analyzer 503 similarly processes the sub-data fields of "actor_id" and "name." The schema analyzer 503 indicates in the schema data 504 that these data fields are sub-data fields of the "actor" data field by writing the identifiers as "actor:actor_id" and "actor:name." The schema analyzer 503 then processes the second document with the film_id of 2 in a similar manner to the first document.

After processing both documents, the schema analyzer 503 has generated the schema data 504 as depicted in FIG. 5. As indicated by the counters, the data fields "film_id," "title," and "Actor" occurred in each document, whereas the data field "year" occurred in just one of the documents. The sub-data fields of "actor_id" and "name" each occurred three times as a result of there being multiple instances of the data fields in the second document. In some instances, the schema analyzer 503 may be programmed to count just one instance of a data field per record/document.

The schema analyzer 503 analyzes the schema data 504 to determine an inferred schema 505. As described above, the schema analyzer 503 identifies statistically significant data fields. As depicted in FIG. 5, each data field occurred at least once in each record except for the data field "year." As a result, the schema analyzer 503 determines that the data field "year" is not statistically significant. This determination may be based on the fact that the percentage of records in which the data field "year" occurs (50%) is substantially lower than the percentage of other data fields (100%). Alternatively, the schema analyzer 503 may be configured to determine that just data fields that occur in at least 75% of records are significant. Since the data field "year" was determined to be statistically insignificant, the data field is not included in the inferred schema 505. The inferred schema 505 includes each of the other data fields which were determined to be statistically significant.

For illustration purposes, the inferred schema 505 is depicted in FIG. 5 in accordance with one example data modeling technique. The inferred schema 505 may also be depicted using other data structures or data models. The inferred schema 505 as modeled indicates that there are three main data fields and two sub-fields of the "Actor" data field. Although illustrated using a data model, the inferred schema 505 is actually a data structure or XML, document that indicates the organization of data in the document database 501. For example, if written as an XML document, the inferred schema 505 may be similar to:

```xml
<?xml version="1.0" encoding="UTF-8" ?>
<xs:schema xmlns:xs="http://www.w3.org/2001/XMLSchema">
<xs:element name="film">
    <xs:attribute name="film_id" type="xs:integer" use=
    "required"/>
    <xs:attribute name="title" type="xs:string" use=
    "optional"/>
    <xs:element name="Actor">
        <xs:complexType>
            <xs:sequence>
                <xs:element name="actor_id" type="xs:integer"/>
                <xs:element name="name" type="xs:string"/>
            </xs:sequence>
        </xs:complexType>
    </xs:element>
</xs:element>
</xs:schema>
```

Figure 6:
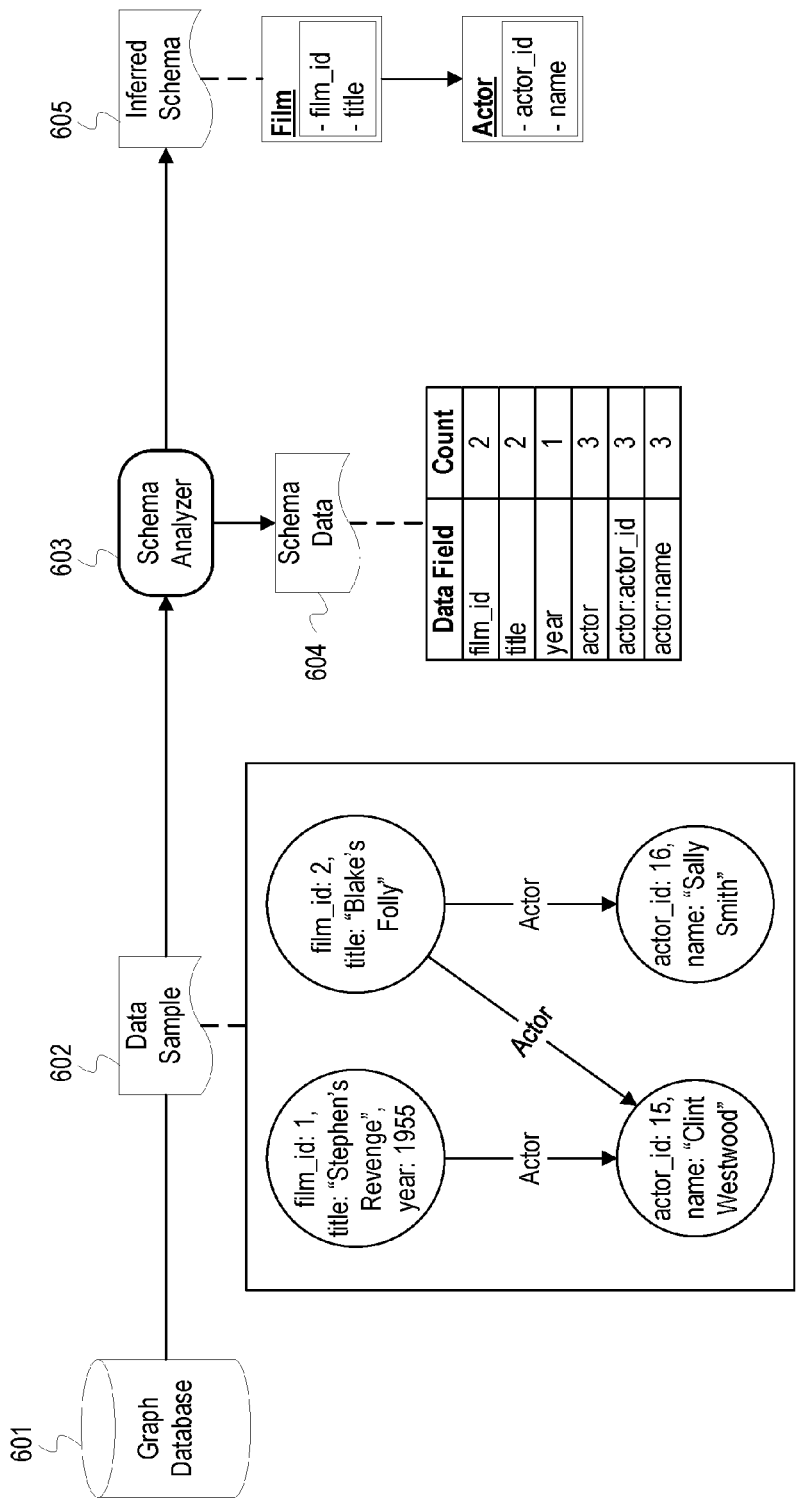
FIG. 6 depicts an example schema analyzer that determines an inferred schema from a schema-less database.

FIG. 6 depicts an example schema analyzer that determines an inferred schema from a schema-less database. FIG. 6 depicts a schema analyzer 603 that is communicatively coupled to a graph database 601. The graph database 601 is a schema-less, NoSQL database that stores a graph such as Neo4j.

The schema analyzer 603 reads the data sample 602 from the graph database 601. As depicted in FIG. 6, the data sample 602 includes four nodes: two that refer to films and two that refer to actors. The schema analyzer 603 processes the data sample 602 as described in the operations of FIG. 2. The schema analyzer identifies the first record in the data sample 602 which in FIG. 6 is the node that includes the film_id of 1. The schema analyzer 603 then identifies data fields in the node.

The schema analyzer 603 writes identifiers for the data fields in schema data 604. Additionally, the schema analyzer 603 creates a counter associated with each data field. When analyzing the first node, the schema analyzer 603 first identifies the data field "film_id." The schema analyzer 603 then writes "film_id" to the schema data 604 and increments a counter associated with the data field to 1. The schema analyzer 603 performs the same operations for the data fields "title" and "year." The schema analyzer 603 then processes the relationships of the node and determines that the node has an "actor" relationship to the node with "actor_id" 15. The relationship between nodes is treated as a data field and recorded in the schema data 604. In some instances, the relationship between nodes may contain additional data such as a key value pair which may be processed as separate data fields. After determining the relationship, the schema analyzer 603 similarly processes the data fields of the node with "actor_id" 15. After processing the first node, the schema analyzer 603 then processes the second node with the film_id of 2.

After processing both nodes, the schema analyzer 603 has generated the schema data 604 as depicted in FIG. 6. As indicated by the counters, the data fields "film_id" and "title" occurred in each of the film nodes and "actor_id" and "name" occurred in each of the actor nodes. The relationship "Actor" also occurred at least once in each film node. The data field "year" occurred in just one of the nodes. The data fields of "actor_id" and "name" are indicated in the schema data 604 as occurring three times because the node with "actor_id" 15 is referred to by each of the film nodes. In some instances, the schema analyzer 603 may be programmed to mark a node as processed so that the node is only processed once.

The schema analyzer 603 analyzes the schema data 604 to determine an inferred schema 605. As described above, the schema analyzer 603 identifies statistically significant data fields. As depicted in FIG. 6, each data field occurred at least once in each respective node type except for the data field "year." As a result, the schema analyzer 603 determines that the data field "year" is not statistically significant. The schema analyzer 603 may determine statistical significance of data fields individually for each node type. For example, the schema analyzer may analyze data fields of the film node types first and then analyze data fields of the actor node types.

Since the data field "year" was determined to be statistically insignificant, the data field is not included in the inferred schema 605. The inferred schema 605 does include each of the other data fields which were determined to be statistically significant as well as the relationship "Actor." For illustration purposes, the inferred schema 605 is depicted in FIG. 6 in accordance with one example data modeling technique. The inferred schema 605 may also be depicted using other data structures or data models. The inferred schema 605 as modeled indicates that there are two data fields with a relationship to two other data fields. Although illustrated using a data model, the inferred schema 605 is actually a data structure or XML document that indicates the organization of data in the graph database 601.

FIGS. 5 and 6 are illustrated using the document database 501 and the graph database 601, respectively. As will be appreciated, similar operations may be performed using a column database or a key value store. For example, if the document database 501 were a key value store, the schema analyzer 503 processes related key value pairs in a manner similar to processing data fields of a document. Likewise, if the document database 501 were a column database, the schema analyzer 503 processes the columns in a row in a manner similar to processing data fields of a document. In order to avoid repetition, separate figures with column and key value database types are not depicted.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 420 and 422 of FIG. 4 can be performed in parallel or concurrently. Additionally, the operations depicted in block 422 may not be performed. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Some operations above iterate through sets of items, such as records and data fields. In some implementations, records may be iterated according to an ordering of the records, in a random order, etc. Also, the number of iterations for loop operations may vary. Different techniques for processing records and data fields may require fewer iterations or more iterations. For example, data fields may be processed in parallel, reducing the number of iterations. Additionally, a loop may not iterate for each record or data field. For example, duplicate instances of data fields within a record may be ignored.

The variations described above do not encompass all possible variations, implementations, or embodiments of the present disclosure. Other variations, modifications, additions, and improvements are possible.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
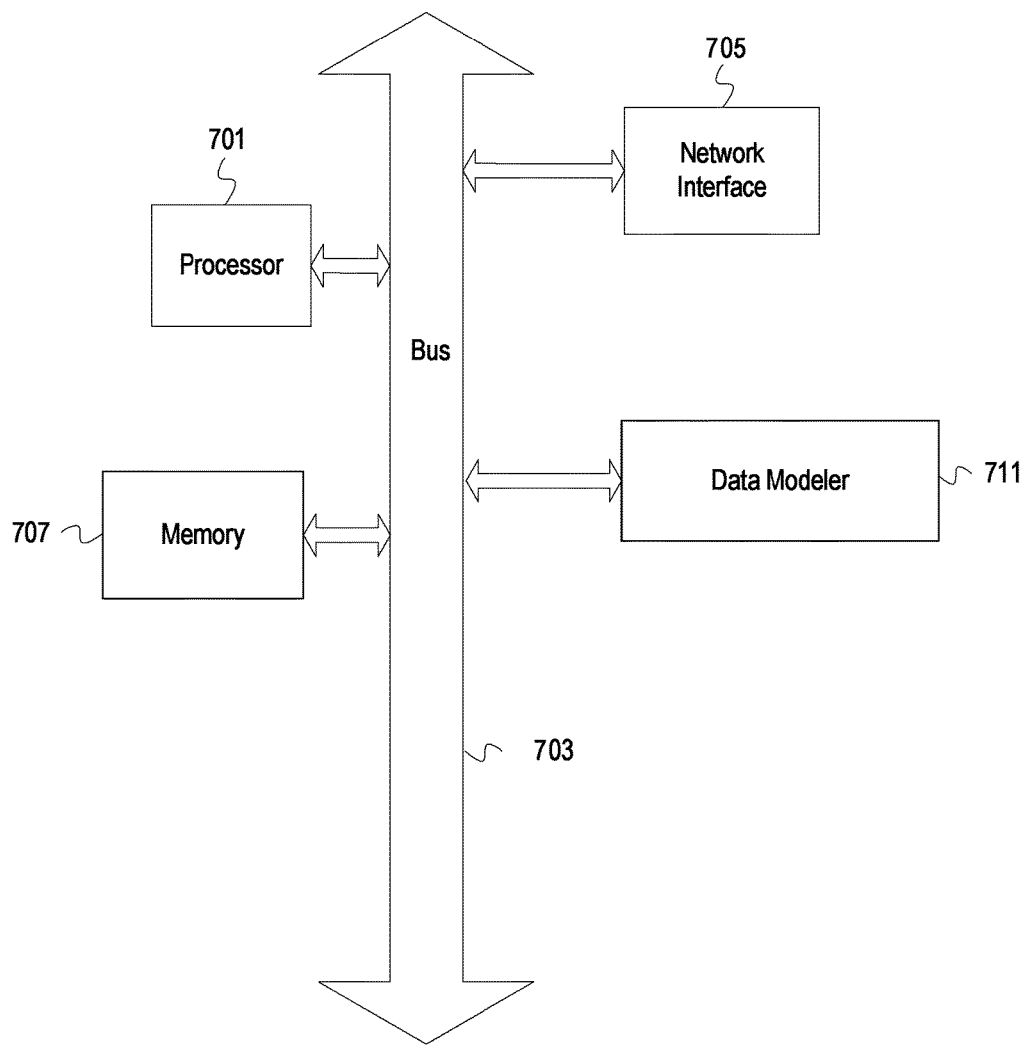
FIG. 7 depicts an example computer system with a schema analyzer.

FIG. 7 depicts an example computer system with a data modeler. The computer system includes a processor 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport® bus, InfiniBand® bus, NuBus, etc.) and a network interface 705 (e.g., a Fiber Channel interface, an Ethernet interface, an interne small computer system interface, SONET interface, wireless interface, etc.). The system also includes a data modeler 711. The data modeler 711 infers and analyzes schema from a non-relational database and a relational database to generate a unified data model which enables integration between the two databases. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for generating a unified data model which enables integration between relational and non-relational databases as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
    parsing a set of records retrieved from a first database to identify a set of one or more data fields in each of the set of records, wherein the first database does not have a defined schema;
    determining statistically significant data fields of the set of data fields across the set of records, wherein statistically significant data fields are determined relative to a number of records in the set of records or determined relative to a number of indications for each of the set of data fields;
    identifying a first plurality of database entities from the statistically significant data fields;
    determining, from a defined schema of a second database, a second plurality of database entities; and
    generating a unified data model for the first database and the second database based, at least in part, on the first and the second plurality of database entities.

2. The method of claim 1, wherein generating the unified data model further comprises:
    determining a set of database entities based, at least in part, on merging and deduplicating the first plurality of database entities and the second plurality of database entities;
    indicating relationships among the set of database entities in the unified data model based, at least in part, on identification of associated database entities in at least one of the first and the second databases; and
    indicating properties of the set of database entities in the unified data model.

3. The method of claim 2, wherein indicating properties of the set of database entities in the unified data model comprises:
    analyzing query histories of the first database and the second database to identify those of the first and second plurality of database entities queried more than a first threshold as frequently queried database entities;
    analyzing the first database and the second database to identify those of the first and second plurality of database entities that have more than a threshold number of instances in at least one of the first and the second databases as large volume database entities; and
    indicating the frequently queried database entities and the large volume database entities in the unified data model.

4. The method of claim 1, further comprising:
    generating a first schema for the first database based, at least in part, on the statistically significant data fields;
    retrieving a second schema from the second database;
    receiving a query that complies with the unified data model;
    translating the query into a first translated query that is compatible with the first schema;
    executing the first translated query on the first database;
    translating the query into a second translated query that is compatible with the second schema;
    executing the second translated query on the second database; and
    responding to the query with results from the first database and the second database.

5. The method of claim 1, wherein determining the statistically significant data fields of the set of data fields across the set of records comprises determining whether a percentage of the set of records in which a first data field of the set of data fields is indicated is greater than a threshold.

6. The method of claim 1, wherein determining the statistically significant data fields of the set of data fields across the set of records comprises determining whether a first data field of the set of data fields is indicated a threshold number of times in the set of records.

7. The method of claim 1, wherein determining the statistically significant data fields of the set of data fields across the set of records comprises comparing a number of indications of a first data field of the set of data fields to a number of indications of a second data field of the set of data fields.

8. The method of claim 1, wherein a database entity of the first database comprises information related to one or more data fields indicated in a document, a set of key value pairs, a column family, or a graph node of the first database and a database entity of the second database comprises information related to one or more data fields indicated in a database table.

9. The method of claim 1, wherein the set of records comprises a random sample of records from the first database.

10. One or more non-transitory machine-readable media having program code for a data modeler stored therein, the program code comprising instructions to:
infer a first schema corresponding to a first database based, at least in part, on identification of statistically significant data fields determined from entities of the first database, wherein the first database does not have a defined schema, wherein statistically significant data fields are determined relative to a number of records in the first database or determined relative to a number of indications for each data field in the first database;
retrieve, from a second database, a second schema, wherein the second database has a defined schema;
generate a unified data model based, at least in part, on the first schema and the second schema; and
migrate data from the second database to the first database using the unified data model.

11. The machine-readable storage media of claim 10, wherein the instructions to migrate data from the second database to the first database using the unified data model comprise instructions to:
read the data from the second database according to the second schema;
transform the data of the second database into data compatible with the unified data model;
transform the data compatible with the unified data model into data compatible with the first schema; and
write the data compatible with the first schema to the first database in accordance with the first schema.

12. An apparatus comprising:
a processor; and
a machine-readable medium having program code executable by the processor to cause the apparatus to,
parse a set of records retrieved from a first database to identify a set of one or more data fields in each of the set of records, wherein the first database does not have a defined schema;
determine statistically significant data fields of the set of data fields across the set of records, wherein statistically significant data fields are determined relative to a number of records in the set of records or determined relative to a number of indications for each of the set of data fields;
identify a first plurality of database entities from the statistically significant data fields;
determine, from a defined schema of a second database, a second plurality of database entities; and
generate a unified data model for the first database and the second database based, at least in part, on the first and the second plurality of database entities.

13. The apparatus of claim 12, wherein the program code executable by the processor to cause the apparatus to generate the unified data model further comprises program code executable by the processor to cause the apparatus to:
determine a set of database entities based, at least in part, on merging and deduplicating the first plurality of database entities and the second plurality of database entities;
indicate relationships among the set of database entities in the unified data model based, at least in part, on identification of associated database entities in at least one of the first and the second databases; and
indicate properties of the set of database entities in the unified data model.

14. The apparatus of claim 13, wherein the program code executable by the processor to cause the apparatus to indicate properties of the set of database entities in the unified data model comprises program code executable by the processor to cause the apparatus to:
analyze query histories of the first database and the second database to identify those of the first and second plurality of database entities queried more than a first threshold as frequently queried database entities;
analyze the first database and the second database to identify those of the first and second plurality of database entities that have more than a threshold number of instances in at least one of the first and the second databases as large volume database entities; and
indicate the frequently queried database entities and the large volume database entities in the unified data model.

15. The apparatus of claim 12, further comprising program code executable by the processor to cause the apparatus to:
generate a first schema for the first database based, at least in part, on the statistically significant data fields;
retrieve a second schema from the second database;
receive a query that complies with the unified data model;
translate the query into a first translated query that is compatible with the first schema;
execute the first translated query on the first database;
translate the query into a second translated query that is compatible with the second schema;
execute the second translated query on the second database; and
respond to the query with results from the first database and the second database.

16. The apparatus of claim 12, wherein the program code executable by the processor to cause the apparatus to determine the statistically significant data fields of the set of data fields across the set of records comprises program code executable by the processor to cause the apparatus to determine whether a percentage of the set of records in which a first data field of the set of data fields is indicated is greater than a threshold.

17. The apparatus of claim 12, wherein the program code executable by the processor to cause the apparatus to determine the statistically significant data fields of the set of data fields across the set of records comprises program code executable by the processor to cause the apparatus to determine whether a first data field of the set of data fields is indicated a threshold number of times in the set of records.

18. The apparatus of claim 12, wherein the program code executable by the processor to cause the apparatus to determine the statistically significant data fields of the set of data fields across the set of records comprises program code executable by the processor to cause the apparatus to compare a number of indications of a first data field of the set of data fields to a number of indications of a second data field of the set of data fields.

19. The apparatus of claim 12, wherein a database entity of the first database comprises information related to one or more data fields indicated in a document, a set of key value pairs, a column family, or a graph node of the first database and a database entity of the second database comprises information related to one or more data fields indicated in a database table.

20. The apparatus of claim 12, wherein the set of records comprises a random sample of records from the first database.

* * * * *